United States Patent [19]

Okamuro

[11] Patent Number: 4,607,535

[45] Date of Patent: Aug. 26, 1986

[54] GAUGE FOR MEASURING THE TENSION IN AN ELONGATE ELEMENT

[75] Inventor: James A. Okamuro, Kalamazoo, Mich.

[73] Assignee: Borroughs Tool & Equipment Corporation, Kalamazoo, Mich.

[21] Appl. No.: 726,857

[22] Filed: Apr. 25, 1985

[51] Int. Cl.⁴ .............................................. G01L 5/06
[52] U.S. Cl. ................................ 73/862.47; 73/862.46
[58] Field of Search ............ 73/862.46, 862.47, 862.48

[56] References Cited

U.S. PATENT DOCUMENTS

| | | | |
|---|---|---|---|
| 3,596,508 | 8/1971 | Howard | 73/862.47 X |
| 3,608,371 | 9/1971 | Kessler | 73/862.46 |
| 4,437,352 | 3/1984 | Deborde et al. | 73/862.47 |
| 4,444,065 | 4/1984 | Okamuro | 73/862.47 |

Primary Examiner—Charles A. Ruehl
Attorney, Agent, or Firm—Flynn, Thiel, Boutell & Tanis

[57] ABSTRACT

A gauge for testing the tension in an elongate flexible element includes a frame having an element engaging surface stationarily supported thereon and facing in a first direction, and a tensioning member reciprocally movably supported on the frame and having thereon an element engaging surface which is spaced from the element engaging surface on the frame and faces in the first direction. Movement of the tensioning member causes its surface to move approximately parallel to the first direction between first and second positions, wherein in the second position the two element engaging surfaces are approximately coplanar. A central element engaging surface is provided between the element engaging surfaces on the frame and tensioning member, and a resilient arrangement biases the tensioning member so as to urge its surface from its second to its first position. An indicator arrangement indicates the distance between the element engaging surface on the tensioning member and its second position, which is proportional to the tension in the element. A holding arrangement can be provided to releasably and firmly hold the elongate element against the central element engaging surface.

17 Claims, 13 Drawing Figures

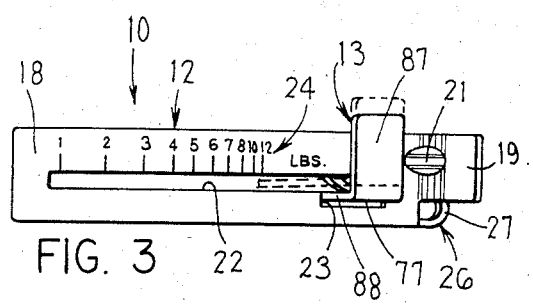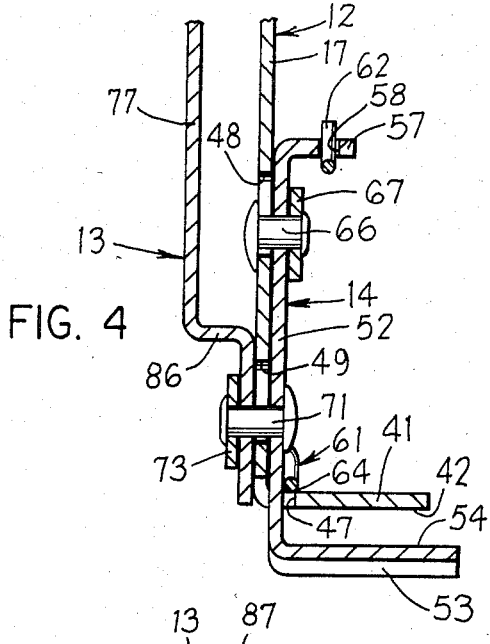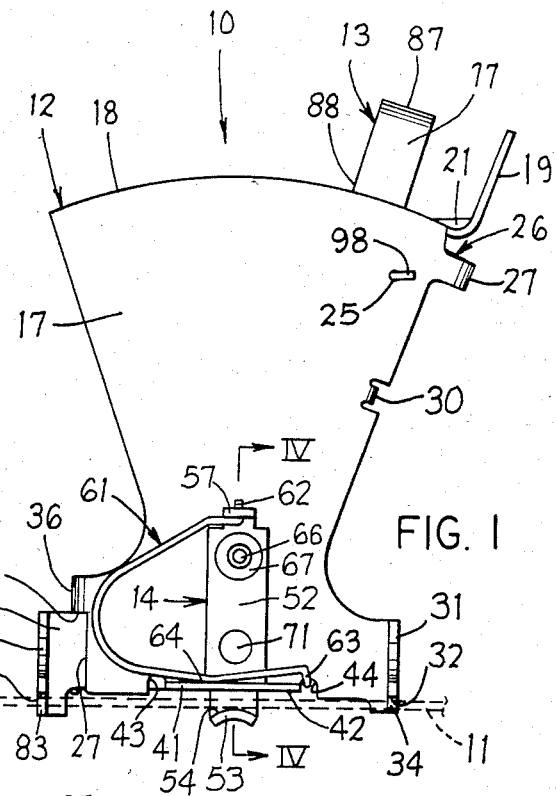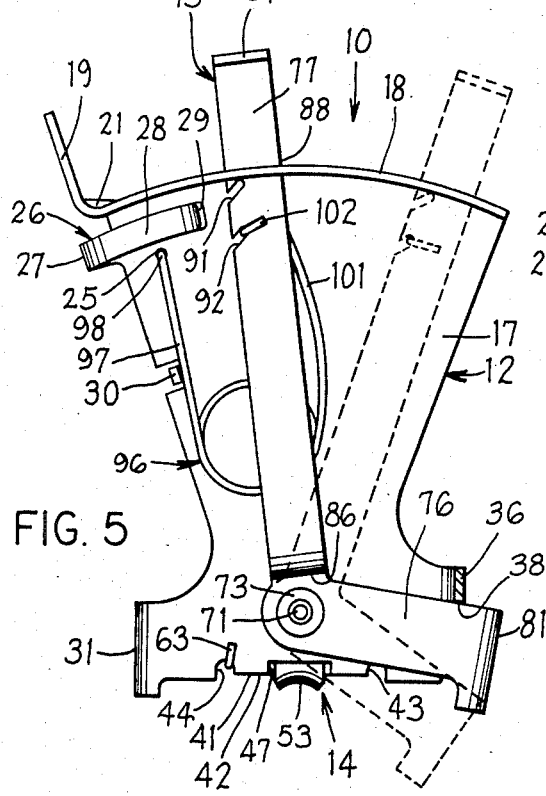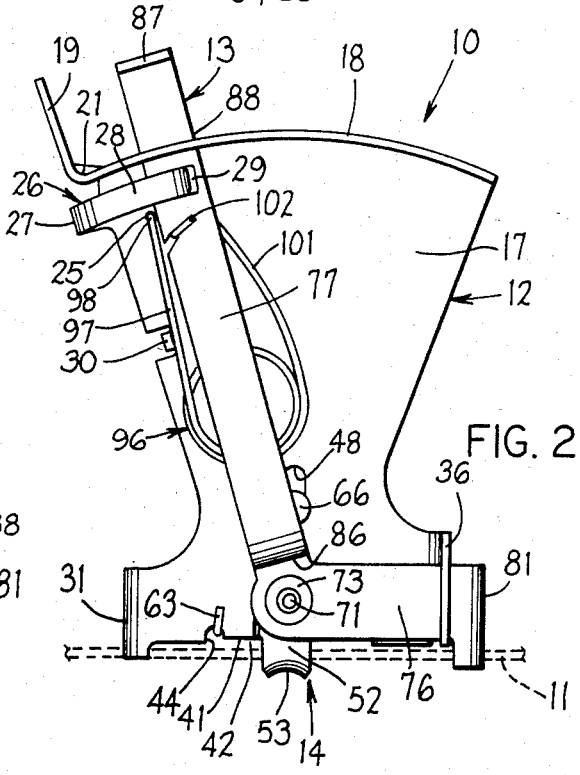

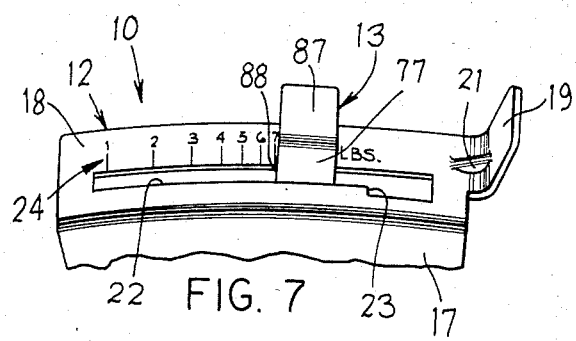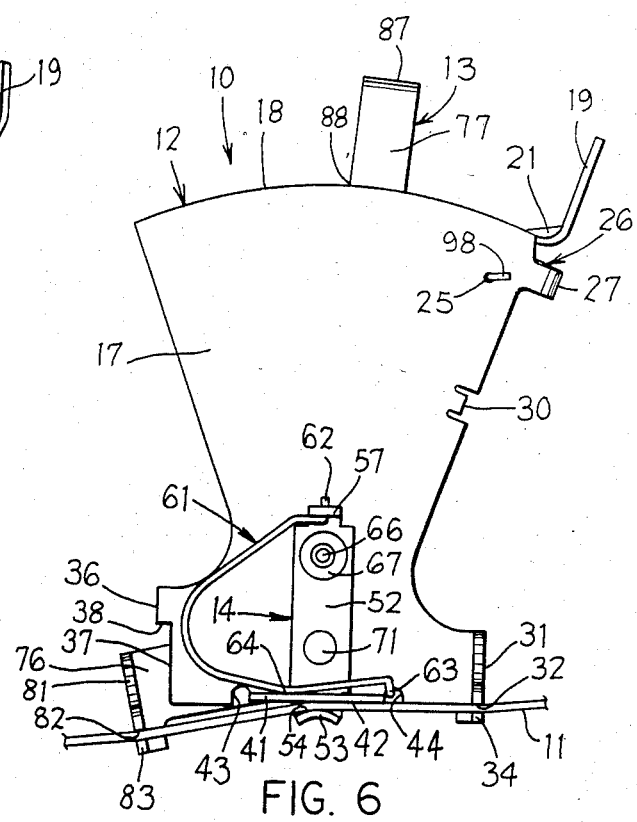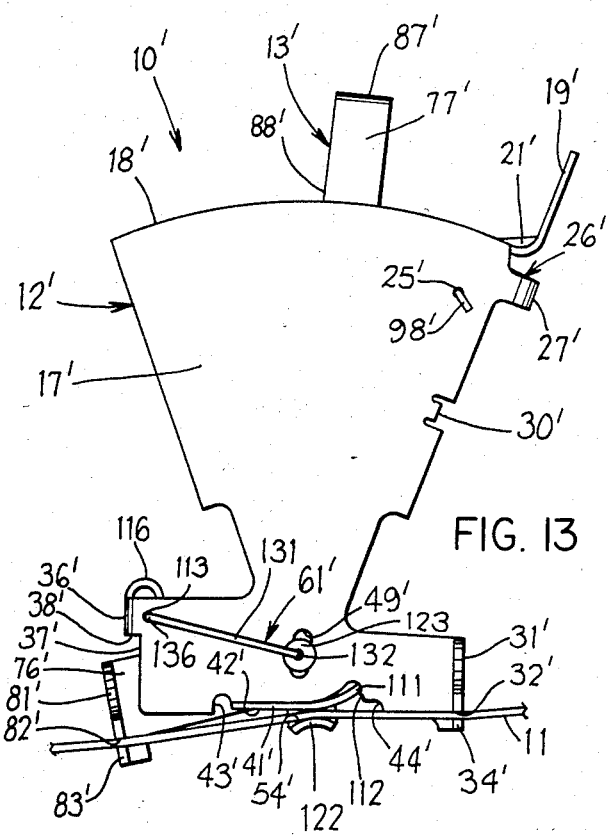

1

GAUGE FOR MEASURING THE TENSION IN AN ELONGATE ELEMENT

FIELD OF THE INVENTION

This invention relates to a tension gauge and, more particularly, to a tension gauge for accurately measuring and visually indicating the tension on an elongate element such as a tensioned fan belt of a vehicle.

BACKGROUND OF THE INVENTION

There is a well-established need for a gauge which can be used to measure the tension on an elongate flexible element, and in particular a tensioned belt such as the fan belt of an automobile. Moreover, many types of airplanes and gliders utilize tensioned metal cables to carry certain stresses and, in order to properly adjust the tension in these cables, a gauge is needed which will accurately measure the tension therein.

Gauges have previously been developed for measuring the tension in a tensioned element, but these gauges have not proved satisfactory in all respects. For example, one conventional and commercially available gauge is first placed on the element and then a force is manually applied to the gauge and thus to the element, the tension in the element then being read from the gauge. A disadvantage of this type of gauge is that the tension reading obtained from the gauge will vary somewhat if the force manually applied to the gauge is varied. Thus, since it is relatively difficult for a person to consistently apply the proper manual force to the gauge in successive measurements, the accuracy and repeatability of measurements taken with the gauge is relatively low.

In addition, the tension gauges disclosed in U.S. Pat. Nos. 2,996,914, 4,186,598 and 4,444,065 are each designed to measure the tension in the fan belt of an automobile. Although they have each been adequate for their intended purpose, they have not been satisfactory in all respects. In particular, they are each relatively large, complex and expensive, whereas a tension gauge which is small, lightweight and inexpensive is much more commercially competitive in the marketplace.

Accordingly, it is an object of the present invention to provide a tension gauge which will accurately and dependably measure the tension on an elongate flexible element such as a tensioned belt.

It is a further object of this invention to provide a tension gauge, as aforesaid, which is relatively compact and simple in structure and is thus relatively inexpensive to manufacture and assemble.

It is a further object of this invention to provide a tension gauge, as aforesaid, which is sufficiently sturdy in structure to withstand rugged treatment, and which requires little or no maintenance.

It is a further object of this invention to provide a tension gauge, as aforesaid, which is easily operated with one hand and directly gives accurate readings of the tension on the elongate element.

It is a further object of this invention to provide a tension gauge, as aforesaid, which will automatically compensate for variations in the thickness of the element being tested.

SUMMARY OF THE INVENTION

The objects and purposes of the invention, including those set forth above, are met by providing a gauge for testing the tension in an elongate flexible element which includes a frame having an element engaging surface stationarily supported thereon, facing in a first direction, and adapted to engage one side of the element; a tensioning member reciprocally movably supported on the frame and having thereon an element engaging surface which is spaced from the element engaging surface on the frame, faces in the first direction, and is adapted to engage the same side of the elongate element as the element engaging surface on the frame, movement of the tensioning member relative to the frame causing its element engaging surface to move in directions approximately parallel to the first direction between first and second positions, the two element engaging surfaces being approximately coplanar when the element engaging surface on the tensioning member is in its second position; a central element engaging surface supported between the element engaging surfaces on the frame and tensioning member; a resilient arrangement yieldably urging movement of the tensioning member in a direction corresponding to movement of the element engaging surface thereon from its second position to its first position; and an indicator arrangement responsive to movement of the tensioning member for indicating the distance between the element engaging surface thereon and its second position, such distance being proportional to the tension in the element. In a preferred embodiment, a holding arrangement is provided to releasably and firmly hold the elongate element against the central element engaging surface, the central element engaging surface being fixedly supported on the frame.

BRIEF DESCRIPTION OF THE DRAWINGS

The invention is described in detail hereinafter with reference to the accompanying drawings, in which:

FIG. 1 is an elevational front view of a tension gauge embodying the present invention;

FIG. 2 is a rear view of the tension gauge of FIG. 1;

FIG. 3 is a top view of the tension gauge of FIG. 1;

FIG. 4 is a sectional view taken along the line IV—IV of FIG. 1;

FIG. 5 is a view similar to FIG. 2 but showing the tension gauge in a different operational position;

FIG. 6 is a view similar to FIG. 1 but showing the tension gauge operatively engaged with an elongate tensioned element;

FIG. 7 is a perspective view of a top portion of the tension gauge of FIG. 7;

FIG. 13 is a view similar to FIG. 8 but showing the tension gauge operatively engaged with an elongate tensioned element.

Figure 10:
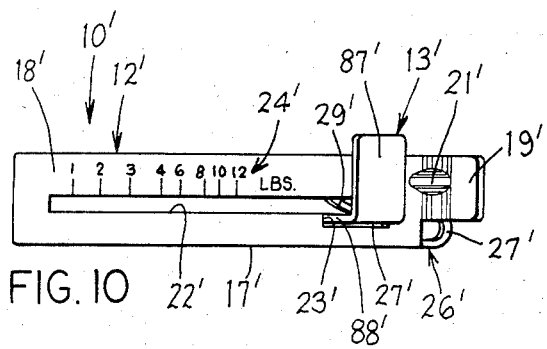
FIG. 10 is a top view of the tension gauge of FIG. 8.

Certain terminology is used in the following description for convenience in reference only and is not to be considered limiting. In particular, the words "up", "down", "right" and "left" designate directions in the drawings to which reference is made. The words "in" and "out" respectively refer to directions toward and away from the geometric center of the tension gauge and designated parts thereof.

DETAILED DESCRIPTION

FIGS. 1 through 7 show a first embodiment of a tension gauge 10 which can be used to measure the tension on an elongate element 11 such as a tensioned belt. Referring to FIGS. 1 and 2, the tension gauge 10 includes a frame 12 having a tension lever 13 and a holding member 14 movably supported thereon.

The frame 12 is made from a single piece of sheet metal which is bent to the desired shape. The frame 12 includes a central portion 17 which extends vertically and a top portion 18 which is bent to define an arcuate flange extending rearwardly from the upper edge of the central portion 17 approximately perpendicular thereto. At one end of the top portion 18 is a tab 19 which is bent to extend radially outwardly from the arcuate flange 18, and the material at the intersection of the flange 18 and tab 19 is bent to define a rib 21 which resists movement of the tab 19 out of its illustrated position.

As best shown in FIGS. 3 and 7, the arcuate flange 18 has an elongate slot 22 therethrough, and the slot 22 has a portion of slightly greater width at its end adjacent the tab 19 so as to define a shoulder 23 which faces the tab 19. A scale 24 is provided on the flange 18 along the slot 22.

The central portion 17 of the frame 12 has a small hole 25 therethrough in the region of the tab 19. A small distance below the tab 19 is an elongate extension 26 which has a portion 27 bent rearwardly from the central portion 17 in a 180° arc and followed by a portion 28 which is inclined toward the central portion 17 and has its end 29 flaring outwardly away from the central portion 17. The extension 26 has a degree of resiliency and, as described hereinafter, functions as a leaf spring. Spaced below the extension 26 is a tab 30 which is bent rearwardly and serves as a stop in a manner described hereinafter.

At one side of the lower end of the central portion 17 is a tab 31 which is bent to extend forwardly perpendicular to the central portion 17, and the tab 31 has a downwardly facing element engaging surface 32 thereon and a forwardly facing element engaging surface 34 which extends downwardly from the rear end of the element engaging surface 32. At the opposite side of the lower end of the central portion 17 is a tab 36 which is bent rearwardly perpendicular to the central portion 17. A vertical slot 37 is provided in the tab 36 at the intersection of the tab 36 and the central portion 17, the slot 37 extending upwardly from the bottom of the tab 36 and having an upper end at 38.

Also provided at the lower end of the central portion 17, intermediate the tabs 31 and 36, is a planar horizontal tab 41 which is bent to extend forwardly perpendicular to the central portion 17, the tab 41 having an element engaging surface 42 on the underside thereof. Near each end of the tab 41, the central portion 17 has a respective semicircular recess 43 or 44. A slotlike opening 47 is provided in the tab 41 at the intersection of the tab 41 and the central portion 14, and two vertically extending slots 48 and 49 (FIG. 4) are provided in the central portion 17 above the opening 47 in tab 41, slot 48 being located directly above slot 49.

The holding member 14 is made from a single piece of sheet metal, and has a central portion 52 which is slidably disposed against the front side of the central portion 17 and extends through the opening 47 in the tab 41. The holding member 14 has at its lower end an upwardly convex tab 53 which extends forwardly perpendicular to the central portion 52 thereof, the tab 53 having an element engaging surface 54 on the upper side thereof. At the upper end of the central portion 52 is a tab 57 which is bent to extend forwardly perpendicular to the central portion 52 and has a hole 58 (FIG. 4) therethrough.

A generally U-shaped torsion spring 61 is provided to urge the holding member 14 upwardly relative to the frame 12 and is made from a single piece of bent spring wire. The spring 61 is disposed adjacent the central portion 17 of the frame 12, and has one leg disposed against the underside of the tab 57 on the holding member 14, the end 62 of such leg being bent to extend upwardly through the hole 58 in the tab 57. The other leg of the spring 61 engages at 64 the upper surface of the tab 41 of the frame 12, and this leg has its outer end 63 bent to form a hook which engages the semicircular recess 44 in the frame 12.

A rivet 66 has its head disposed against the rear side of the central portion 17 of the frame 12, and the shank of the rivet extends through the slot 48 in the central portion 17, through an opening in the central portion 52 of the holding member 14, and through a washer 67, and is upset against the washer 67. A rivet 71 has its head disposed against the forwardly facing side of the central portion 52 of the holding member 14, and the shank thereof extends through an opening in the central portion 52 of the holding member 14, through the slot 49 in the central portion 17 of the frame 12, through an opening in the tensioning lever 13 and through a washer 73, and is upset against the washer 73. The rivet 71 thus serves as an axle which pivotally supports the lever 13 on the holding member 14, and the arcuate flange 18 on the frame 12 is arranged so as to be approximately concentric to the rivet 71. The holding member 14 and lever 13 can simultaneously move vertically relative to the frame 12 through sliding movement of the rivets 66 and 71 within the slots 48 and 49 in the frame 12. This vertical movement of the holding member 14 relative to the frame 12 causes the element engaging surface 54 to move between positions adjacent and spaced from the element engaging surface 42 on the frame 12.

The tensioning lever 13 is made from a single piece of sheet metal which is bent to the desired shape. The tensioning lever 13 has two arms 76 and 77 which extend radially outwardly from the rivet 71 on which the lever 13 is pivotally supported, the angle between the arms 76 and 77 being approximately 105°.

The arm 76 extends adjacent and parallel to the central portion 17 of the frame 12, and extends through the slot 37 in the tab 36 of the frame 12. Engagement of the arm 76 with the upper end 38 of the slot 37 limits counterclockwise pivotal movement of the lever 13 in FIG. 2 about the pivot axis defined by the rivet 71. The lever 13 has a flange 81 at the outer end of the arm 76 which extends forwardly perpendicular to the arm 76. The flange 81 has a downwardly facing element engaging surface 82 (FIG. 1) thereon, and has a forwardly facing element engaging surface 83 which extends downwardly from the rear end of the element engaging surface 82.

The arm 77 has a portion 86 (FIG. 4) near the rivet 71 which is bent to extend outwardly away from the central portion 17 of the frame 12, the arm 77 then extending upwardly parallel to and spaced from the central portion 17 of the frame. The arm 77 extends through the slot 22 in the arcuate flange 18 of the frame 12 and, at the upper end of the arm 77, the lever 13 has a tab 87 which is bent to extend rearwardly from the arm 77 perpendicular thereto. In the region of the arcuate flange 18, the arm 77 has an edge portion 88 which, depending on the angular position of the lever 13, will be aligned with and thus designate a tension value on the scale 24, as described hereinafter. The arm 77 also has, a small distance below the arcuate flange 18 of the frame 12, two vertically spaced, upwardly inclined slots 91 and 92 (FIG. 5) in the side thereof opposite the edge portion 88.

A tension spring 96 (FIGS. 2 and 5) made from a single piece of bent spring wire is provided adjacent the central portion 17 of the frame 12, and has a leg 97 which engages the stop 30 on the frame and which has its end 98 bent to extend through the hole 25 in the central portion 17 of the frame 12. The other leg 101 of the spring 96 has an end 102 which is bent to form a hook and engages a selected one of the slots 91 and 92. The spring 96 urges the lever 13 to pivot clockwise in FIGS. 2 and 5. By shifting the end 102 of the spring 96 from the slot 92 to the slot 91 or from the slot 91 to the slot 92, the effective force exerted by the spring 96 on the lever 13 can be varied in order to effect calibration of the gauge 10.

FIGS. 8 through 13 illustrate a tension gauge 10' which is an alternative embodiment of the tension gauge 10 described above. The tension gauge 10' is structurally similar in many respects to the tension gauge 10, and identical and corresponding parts of the tension gauge 10' have therefore been identified with the same reference numerals used for the tension gauge 10, but with a prime (') added. Only the structural differences between the tension gauges 10 and 10' are described in detail below.

The tension gauge 10' of FIGS. 8-13 does not include the holding member 14 which is present in the tension gauge 10, and the frame 12' of the tension gauge 10' does not have an opening through its flange 41' and has only a single vertically extending slot 49' in the central portion 17' thereof.

The flange 41' of the frame 12' is curved upwardly at the end 111 thereof nearest the tab 31', and a sector-shaped recess 112 in the frame 12' is adjacent and communicates with the recess 44'. A small hole 113 is provided through the central portion 17' of the frame 12' near the upper end of the tab 36'. The tab 36' has at its upper end an elongate extension 116 which is bent inwardly in a 180° arc so that the outer end 117 thereof extends downwardly in the region of the hole 113.

The tensioning lever 13' is similar to the lever 13 of the embodiment of FIGS. 1-7, except that it has a holding arm 121 thereon which extends downwardly at approximately a right angle to the arm 76'. The lever 13' has, at the lower end of arm 121, an upwardly convex, forwardly extending tab 122, the upper surface 54' of this tab being an element engaging surface corresponding to the surface 54 in FIGS. 1-7.

Figure 11:
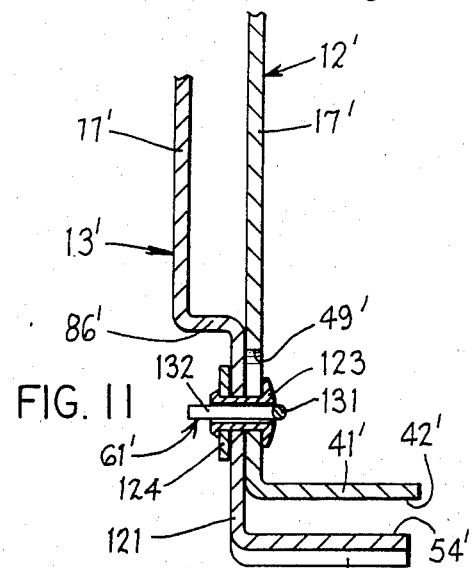
FIG. 11 is a sectional view taken along the line XI—XI in FIG. 8.
Figure 8:
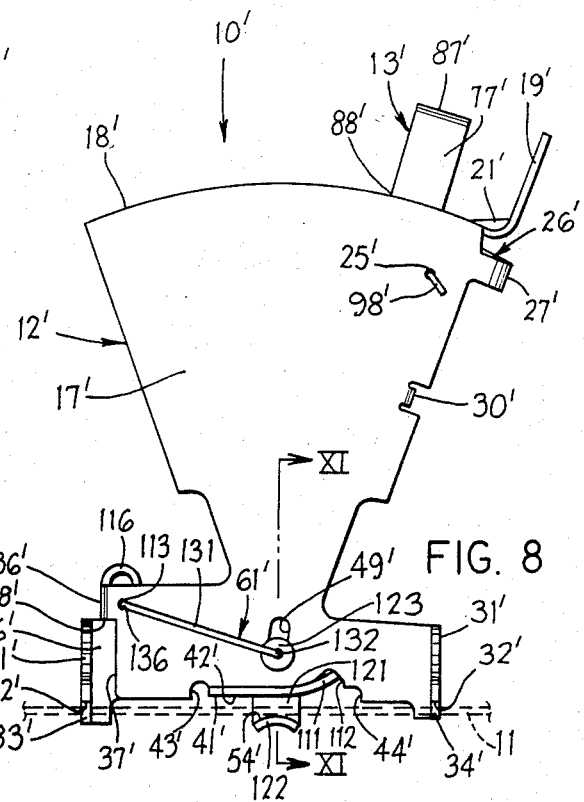
FIG. 8 is an elevational front view of an alternative embodiment of the tension gauge of FIG. 1.
Figure 12:
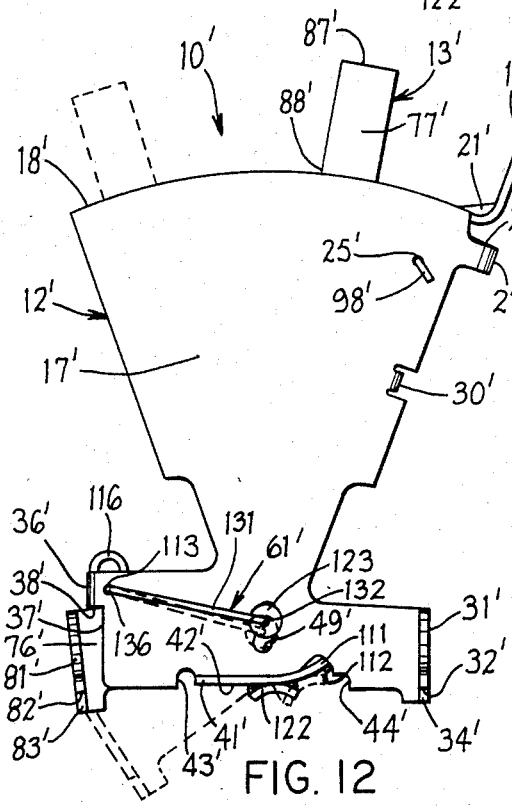
FIG. 12 is a view similar to FIG. 8 showing two further operational positions of the tension gauge.
Figure 9:
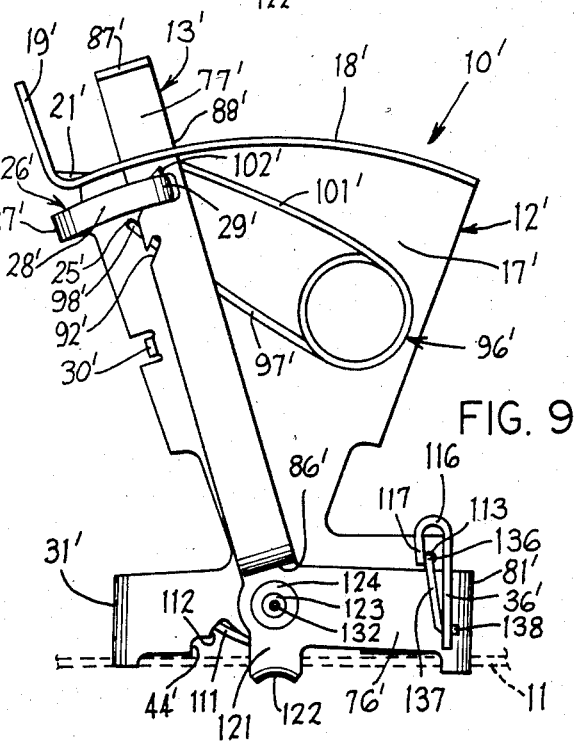
FIG. 9 is a rear view of the tension gauge of FIG. 8.

As shown in FIG. 11, the lever 13' is pivotally and vertically movably supported on the frame 12' by a rivet 123 which has its head slidably disposed against the front side of the frame 12' and has its shank extending through the slot 49' in the frame 12', through an opening in the lever 13', and through a washer 124, the shank of the rivet being upset against the washer 124. The rivet 23 has a central, axially extending bore therethrough.

The torsion spring 61' corresponds in function to the spring 61 of the tension gauge 10, but differs significantly in structure. In particular, the torsion spring 61' is made from a single piece of bent spring wire, has a central portion 131 which extends adjacent the front side of the central portion 17' of the frame 12' from the hole 113 to the rivet 123, and has an end portion 132 which is perpendicular to the central portion 131 and extends through the central opening in the rivet 123. At the opposite end of the central portion 131 is a portion 136 which is perpendicular to the central portion 131, extends through the hole 113 in the frame 12', and engages the end 117 of the extension 116 on the tab 36' of the frame 12'. The portion 136 is followed by a further portion 137 which is perpendicular to the portion 136 and extends downwardly therefrom, and at the lower end of the portion 137 is an end portion 138 which is bent to extend through a hole provided at the lower end of the tab 36' of the frame 12'.

OPERATION

The tension in the elongate element 11 is measured with the tension gauge 10 of FIGS. 1-7 in the following manner. The user pinches the tab 19 of the frame 12 and the tab 87 of the lever 13 together, causing the lever 13 to move against the force of the spring 96 from the position shown in broken lines in FIG. 5 to the position shown in FIGS. 1 and 2. As the lever 13 is pivoted from the position shown in broken lines in FIG. 5 to the position shown in solid lines in FIG. 5, the gripping member 14, which is urged upwardly by the spring 61, remains in its uppermost position. When the lever 13 reaches the position shown in solid lines in FIG. 5, the arm 76 thereof engages the upper end 38 of the slot 37 in the tab 36 of the frame 12, thereby preventing further upward movement of the flange 81 on the lever 77. As the upper end of the arm 77 of the lever 13 is thereafter moved from the position shown in solid lines in FIG. 5 to the position shown in FIGS. 1 and 2, the upper end 38 of the slot 37 acts as a fulcrum, and the rivet 71 is forced downwardly in the slot 49 and moves the gripping member 14 downwardly against the urging of the spring 61, thereby causing the element engaging surface 54 on the gripping member 14 to move downwardly away from the element engaging surface 42 on the frame 12. As the lever 13 reaches the position shown in FIGS. 1 and 2, the extension 26 on the frame 12 engages the arm 77 of the lever and acts as a leaf spring which urges the arm toward the central portion 17 of the frame 12 and thus transversely within the wider portion of the slot 22 in the arcuate flange 18 of the frame 12, so that a return movement of the lever 13 is prevented by engagement of the lever 13 with the shoulder 23 in the slot 22. In this position, the element engaging surface 82 is approximately coplanar with the element engaging surfaces 32 and 42, as shown in FIG. 1.

The lower end of the gauge is then moved forwardly toward the elongate element 11 until the element 11 extends between the element engaging surfaces 42 and 54 and is adjacent the element engaging surfaces 32 and 82, as shown in FIG. 1. While holding the gauge in this position, the user manually urges the upper end of the arm 77 of the lever 13 in a direction away from the central portion 17 of the frame 12 against the urging of the leaf spring 26, thereby moving the arm 77 of the lever 13 out of engagement with the shoulder 23 in the slot 22 and permitting the spring 96 to move the lever 13 back toward its original position. During initial movement of the lever 13 away from the position shown in FIGS. 1 and 2, the gripping member 14 and rivet 71 are moved upwardly by the urging of the spring 61 until the elongate element 11 is firmly clamped between the element engaging surfaces 42 and 54. Thereafter, further movement of the lever 13 by the spring 96 causes the element engaging surface 82 to apply a downward force to the elongate element 11 until the tension in the element 11 balances the urging of the spring 96. This equilibrium position is illustrated in FIG. 6 and, since the degree of angular movement of the lever 13 will be proportional to the tension in the elongate element 11, the user reads the tension in the element 11 by observing the location on scale 24 which is aligned with the edge portion 88 of the lever 13. The element engaging surface 54 on the gripping member 14 keeps the element 11 pressed firmly against the element engaging surface 42, and the gauge effects a measurement in terms of the relative positions of element engaging surfaces 32, 42 and 82. Since surfaces 32, 42 and 82 all engage the same side of the element 11, an accurate reading is obtained regardless of the thickness of the element 11. It will be recognized that the surface 42 could be eliminated and that the surface 54 could be fixedly provided on the frame 12; the readings obtained would then vary slightly in dependence on the thickness of the element 11, but in many applications this would be acceptable.

After taking the necessary reading, the tension gauge is removed from the elongate element 11 by performing in reverse order the sequence of steps described above.

The tension gauge 10' of FIGS. 8–13 is operated in a manner similar to the tension gauge 10, and the operation thereof is therefore not described in detail. The only significant difference is that, as the lever 13' is moved by the spring 96' from the position shown in solid lines in FIG. 12 to the position shown in broken lines in FIG. 12, the element engaging surface 54' on the lever 13' moves a small distance horizontally relative to the element engaging surface 42' in a direction toward the end 111 thereof.

Although two preferred embodiments of the inventive tension gauge have been disclosed in detail for illustrative purposes, it will be recognized that variations or modifications of the disclosed gauges, including the rearrangement of parts, lie within the scope of the present invention.

The embodiments of the invention in which an exclusive property or privilege is claimed are defined as follows:

1. A gauge for measuring the tension on an elongate flexible element, comprising:

frame having means defining spaced first and second element engaging surfaces which are stationarily supported on said frame, face in a first direction, are approximately coplanar, and are each adapted to engage one side of the element;

a tensioning member reciprocally movably supported on said frame and having thereon a third element engaging surface which is spaced from said second element engaging surface on a side thereof remote from said first element engaging surface, faces in said first direction, and is adapted to engage the same side of the elongate element as said first and second element engaging surfaces, movement of said tensioning member relative to said frame causing said third element engaging surface to move in directions approximately parallel to said first direction between first and second positions, said third element engaging surface being approximately coplanar with said first and second element engaging surfaces in said second position, and said third element engaging surface moving from its second position to its first position in said first direction;

holding means for releasably and firmly holding the elongate element against said second element engaging surface;

first resilient means yieldably urging movement of said tensioning member in a direction corresponding to movement of said third element engaging surface from its second position to its first position; and indicator means responsive to said movement of said tensioning member for indicating the distance between said third element engaging surface and said second position thereof, such distance being proportional to the tension in the element.

2. The gauge according to claim 1, wherein said tensioning member is a lever supported for pivotal movement about a pivot axis which extends in a second direction substantially perpendicular to said first direction and which is located in the region of said second element engaging surface, said third element engaging surface being provided on said lever at a location spaced radially from said pivot axis.

3. The gauge according to claim 2, wherein said holding means includes:

a holding member reciprocally movably supported on said frame and having a fourth element engaging surface thereon which faces said second element engaging surface, movement of said holding member causing said fourth element engaging surface to move in directions substantially parallel to said first direction between positions adjacent and spaced from said second element engaging surface;

second resilient means yieldably urging movement of said holding member in a direction corresponding to movement of said fourth element engaging surface from said spaced position to said adjacent position; and means cooperable with said lever and said holding member for effecting movement of said fourth element engaging surface from its adjacent position to its spaced position in response to movement of said third element engaging surface to its second position.

4. The gauge according to claim 3, wherein said holding member is supported on said frame for reciprocal movement in directions parallel to said first direction; and wherein said means for effecting movement of said fourth element engaging surface includes means defining on said holding member an axle which is coincident with said pivot axis and which supports said lever for pivotal movement about said pivot axis, and includes stop means engageable with said lever at a location spaced radially from said pivot axis thereof for limiting movement of said second element engaging surface in a direction opposite said first direction.

5. The gauge according to claim 2, wherein said holding means includes:

means defining an axle which is coaxial with said pivot axis of said lever and is supported on said frame for movement in directions approximately parallel to said first direction, said axle pivotally supporting said lever;

a fourth element engaging surface provided on said lever near said pivot axis thereof and facing said second element engaging surface, movement of said axle relative to said frame causing said fourth element engaging surface to move between positions adjacent and spaced from said second element engaging surface; and second resilient means for yieldably urging said fourth element engaging surface toward said adjacent position thereof.

6. The gauge according to claim 5, wherein said second resilient means includes a torsion spring, one end of said torsion spring being supported on said frame and the other end of said torsion spring being supported on said axle.

7. The gauge according to claim 2, wherein said indicator means includes said lever having a portion which is spaced radially from said pivot axis, and includes means defining a scale on said frame which extends along the path of movement of said portion of said lever.

8. The gauge according to claim 7, wherein said lever has first and second radially extending arms which are approximately perpendicular to each other, said third element engaging surface being provided on said first arm and said portion of said lever being provided on said second arm.

9. The gauge according to claim 8, wherein said first resilient means includes a tension spring having one end supported on said frame and its other end supported on said second arm of said lever at a location spaced radially from said pivot axis.

10. The gauge according to claim 9, wherein said frame includes a piece of sheet metal having a portion which extends substantially perpendicular to said pivot axis and having a further portion which is bent relative to said first-mentioned portion so as to define an arcuate flange approximately concentric to said pivot axis, said scale being provided on said arcuate flange.

11. The gauge according to claim 10, wherein said arcuate flange has an elongate slot therein, said second arm of said lever being slidably received in said slot.

12. A gauge for measuring the tension on an elongate flexible element, comprising:

a frame having means defining a first element engaging surface which is stationarily supported on said frame, faces in a first direction, and is adapted to engage one side of the element;

a tensioning lever supported on said frame for pivotal movement about a pivot axis which extends in a second direction substantially perpendicular to said first direction, said lever having thereon at a location spaced radially from said pivot axis a second element engaging surface which is spaced from said first element engaging surface, faces in said first direction, and is adapted to engage the same side of the elongate element as said first element engaging surface, pivotal movement of said tensioning lever relative to said frame causing said second element engaging surface to move in directions approximately parallel to said first direction between first and second positions, said second element engaging surface being approximately coplanar with said first element engaging surface in said second position, and said second element engaging surface moving from its second to its first position in said first direction;

means defining a third element engaging surface which is stationarily supported on said frame between said first and second element engaging surfaces, said pivot axis of said lever being in the region of said third element engaging surface;

resilient means yieldably urging pivotal movement of said tensioning lever in a direction corresponding to movement of said second element engaging surface from its second position to its first position; and indicator means responsive to said movement of said tensioning lever for indicating the distance between said second element engaging surface and said second position thereof, such distance being proportional to the tension in the element.

13. The gauge according to claim 12, wherein said indicator means includes said lever having a portion which is spaced radially from said pivot axis, and includes means defining a scale on said frame which extends along the path of movement of said portion of said lever.

14. The gauge according to claim 13, wherein said lever has first and second radially extending arms which are approximately perpendicular to each other, said second element engaging surface being provided on said first arm and said portion of said lever being provided on said second arm.

15. The gauge according to claim 14, wherein said resilient means includes a tension spring having one end supported on said frame and its other end supported on said second arm of said lever at a location spaced radially from said pivot axis.

16. The gauge according to claim 15, wherein said frame includes a piece of sheet metal having a portion which extends substantially perpendicular to said pivot axis and having a further portion which is bent relative to said first-mentioned portion so as to define an arcuate flange approximately concentric to said pivot axis, said scale being provided on said arcuate flange.

17. The gauge according to claim 16, wherein said arcuate flange has an elongate slot therein, said second arm of said lever being slidably received in said slot.

* * * * *